United States Patent [19]

Sakuragi

[11] Patent Number: 5,406,384
[45] Date of Patent: Apr. 11, 1995

[54] DOCUMENT FILING APPARATUS IN WHICH A TITLE AND/OR A KEY WORD IS SELECTED FROM IMAGE INFORMATION DISPLAYED

[75] Inventor: Hiroshi Sakuragi, Yokohama, Japan

[73] Assignee: Kabushiki Kaisha Toshiba, Kawasaki, Japan

[21] Appl. No.: 888,129

[22] Filed: May 26, 1992

[30] Foreign Application Priority Data

Jun. 28, 1991 [JP] Japan .................. 3-158461

[51] Int. Cl.[6] .................................. H04N 1/00
[52] U.S. Cl. ...................... 358/403; 358/453
[58] Field of Search ............... 358/403, 442, 444, 448, 358/453, 462, 451, 452; H04N 1/00; 379/100; 395/150, 151; 382/10, 11, 12, 13

[56] References Cited

U.S. PATENT DOCUMENTS

| | | | |
|---|---|---|---|
| 4,574,395 | 3/1986 | Kato . | |
| 4,604,653 | 8/1986 | Shimizu . | |
| 4,706,126 | 11/1987 | Kondo | 358/426 |
| 4,759,053 | 7/1988 | Satomi et al. | 358/470 |
| 4,893,258 | 1/1990 | Sakuragi | 358/451 |
| 4,942,479 | 7/1990 | Kanno | 358/444 |
| 5,040,232 | 8/1991 | Kanno . | |
| 5,081,688 | 1/1992 | Sakuragi . | |
| 5,129,011 | 7/1992 | Nishikawa et al. . | |
| 5,200,830 | 4/1993 | Imaizumi et al. | 358/442 |
| 5,220,648 | 7/1993 | Sato . | |
| 5,263,136 | 11/1993 | DeAguiar et al. . | |

FOREIGN PATENT DOCUMENTS

| | | |
|---|---|---|
| 1-65975 | 3/1989 | Japan . |
| 3-26169 | 6/1989 | Japan . |
| 1-236762 | 9/1989 | Japan . |

*Primary Examiner*—Richard Hjerpe
*Assistant Examiner*—Kim Yen Vu
*Attorney, Agent, or Firm*—Cushman, Darby & Cushman

[57] ABSTRACT

An area of the display screen of a display device on which image information corresponding to a document to be stored has been displayed is specified by the operation of a mouse. If a portion of the image information corresponding to the specified area of the display screen is recognized as a character, the portion of the image information is registered as retrieval key data when the image information is stored in the optical disk device of a document filing apparatus.

11 Claims, 6 Drawing Sheets

DOCUMENT FILING APPARATUS IN WHICH A TITLE AND/OR A KEY WORD IS SELECTED FROM IMAGE INFORMATION DISPLAYED

1. Field of the Invention

The present invention relates, in general, to apparatus which file documents in the form of images with retrieval key data, e.g., a title, a plurality of retrieval key words etc., and retrieve a desired document (image information) based on a designated title and/or retrieval key words to display and/or print the same, when desired.

2. Description of the Related Art

In recent years, document filing apparatus, e.g., image filing apparatus, have been developed to store enormous amount of image information such as documents produced in companies or offices. Each document is read by an image scanner (two-dimensional scanning device) and the document is converted to image information corresponding to the document. The image information is stored in an optical disk. The stored image information is retrieved and is outputted as a visible image by an output device, e.g., a CRT (Cathode Ray Tube) display device, a printing device, etc.

In an image filing apparatus as described above, a title corresponding to the document to be filed when the image information corresponding to the document is filed. The title is manually input through a keyboard, whereas the document is inputted through the image scanner. However, it is rather troublesome to manually input the title of a document if many documents have to be filed, and a title is input for each document.

To solve the above-described problem, a specific title registration mode, also known as a package title registration mode, is provided to a conventional image filing apparatus. In this package title registration mode, the following steps are carried out before documents are stored in the image filing apparatus. Titles, each corresponding to documents which will be stored, are stored in a magnetic disk, e.g., floppy disk, by an external device, e.g., a personal computer. The magnetic disk is set in the image filing apparatus when the document is read by the image scanner. The title which was previously stored in the magnetic disk is read out and is registered when the document is stored in the image filing apparatus in the form of images.

In the above-described conventional image filing apparatus, titles have to be inputted before image filing through a keyboard. Furthermore, a corresponding relationship between the title read out of the magnetic disk and the image information corresponding to the document to be stored should be confirmed by an operator when each document is stored in the image filing apparatus.

SUMMARY OF THE INVENTION

It is an object of the present invention to simplify the registration of retrieval key data including a title and/or a plurality of retrieval key words corresponding to a document to be stored in a document filing apparatus.

It is another object of the invention to provide an improved method for inputting retrieval key data including a title and/or a plurality of retrieval key words corresponding to a document to be stored in a document filing apparatus.

To accomplish the above-described objects, a document filing apparatus includes a display unit on which image information corresponding to a document is displayed, a pointing device for specifying a portion of the image information, as retrieval key data, displayed by the display unit, a character recognition section for recognizing, as a character, the portion of the image information, an optical disk filing unit for storing the image information, and a recording section for registering the portion of the image information as retrieval key data when the image information is stored.

The document filing apparatus may include a scanning unit for scanning the document to be filed and for outputting image information corresponding to the document.

BRIEF DESCRIPTION OF THE DRAWINGS

These and other objects and advantages of this invention will become more readily appreciated from the following detailed description of the presently preferred exemplary embodiment of the invention, taken in conjunction with the accompanying drawings, wherein like reference numerals throughout the various figures denote like structure elements and wherein.

DETAILED DESCRIPTION OF THE PREFERRED EMBODIMENT

A preferred embodiment of the present invention is now described in more detail with reference to the accompanying drawings. In this embodiment, an image filing apparatus which uses an optical disk is provided as a document filing apparatus.

Figure 1:
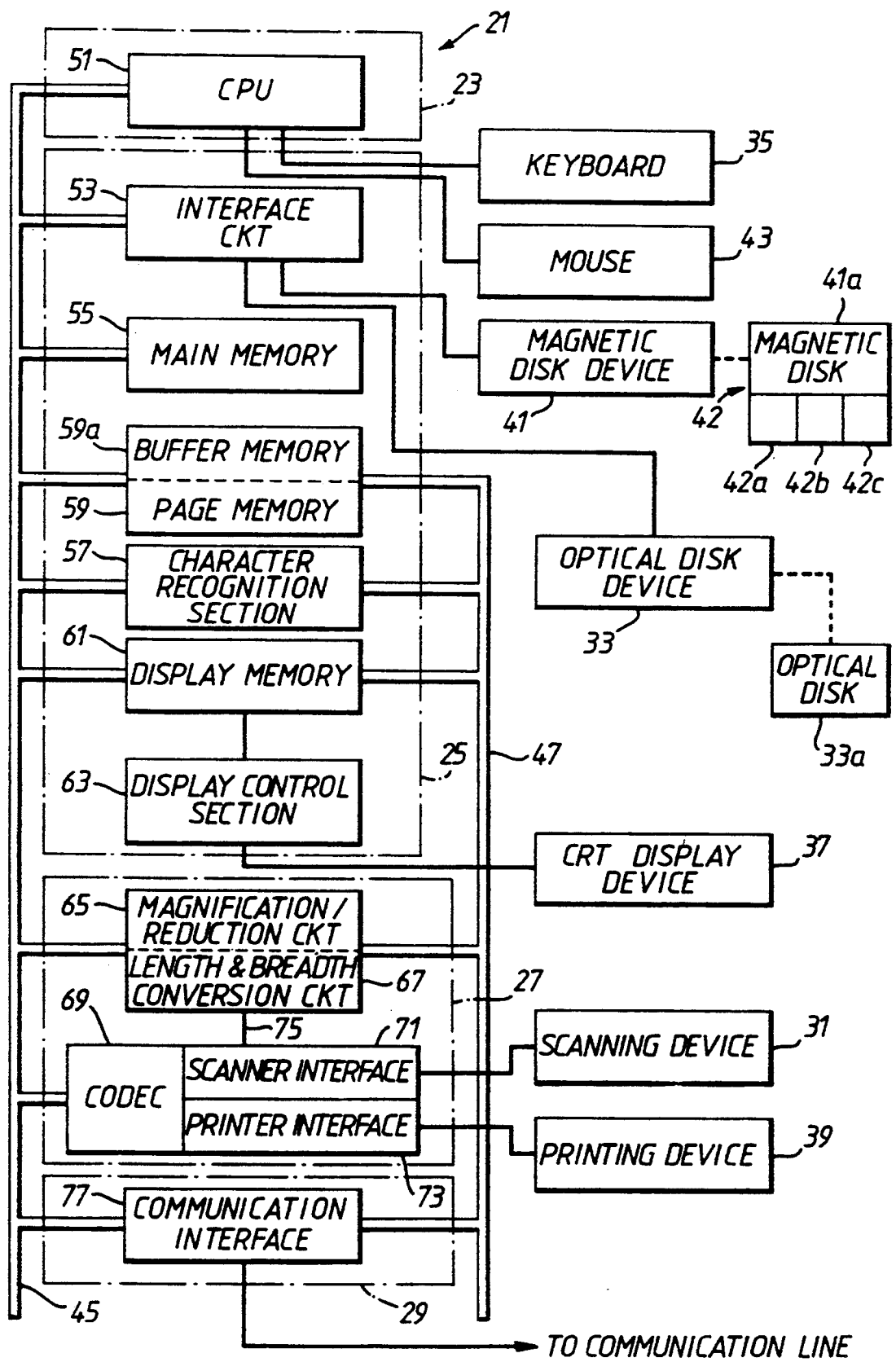
FIG. 1 is a block diagram of a document filing apparatus of one embodiment of the present invention.

As shown in FIG. 1, an image filing apparatus 21 includes a control module 23, a memory module 25, an image processing module 27 and a communication control module 29. Image filing apparatus 21 further includes a scanning device 31, an optical disk device 33 having an optical disk 33a, a keyboard 35, a CRT (Cathode Ray Tube) display device 37, a printing device 39, a magnetic disk device 41 having a magnetic disk 41a such as a floppy disk, a pointing device 43, i.e., a mouse, a system bus 45 and an image bus System bus 45 interconnects control module 23, memory module 25, image processing module 27 and communication control module 29 to transmit control signals therebetween. Image bus 47 also interconnects memory module 25, image processing module 27 and communication control module 29 to transmit image signals therebetween.

Control module 23 includes a CPU 51 which carries out a control operation for storing, retrieving or editing image information, and an interface circuit 53 through which CPU 51, optical disk device 33 and magnetic disk device 41 are connected. Keyboard 35 and mouse 43 are respectively connected to CPU 51.

Memory module 25 includes a main memory 55 having a ROM (read only memory) and a RAM (random access memory), a character recognition section 57, a page memory (image information memory) 59, a display memory 61 acting as an interface for a display, and a display control section 63. Main memory 55 stores control programs in the ROM (not shown) for executing a storing of image information, a retrieving of image information and an editing of image information. Main memory 55 also stores management data in the RAM (not shown). Character recognition section 57 recognizes characters of image information. Page memory 59 has a memory capacity corresponding to image information of several pages of an A4-sized document. A buffer memory 59a is provided in page memory 59 to temporarily store image information which will be stored in optical disk 33a or image information read out of optical disk 33a.

Display memory 61 temporarily stores image information to be displayed on the display screen 37s (display area) of CRT display device 37. Image information output from page memory 59 or buffer memory 59a may be edited, e.g., magnification, reduction, rotation, insertion, inversion (from a negative image to a positive image and vise versa), etc., and then is stored in display memory 61. Display control section 63 controls the display operation of CRT display device 37.

Image processing module 27 includes a magnification/reduction circuit 65 for carrying out a magnification/reduction of an image, a length and breadth conversion circuit 67 for executing the rotation of an image, a signal compressing/expanding circuit (CODEC) 69 for carrying out an encoding of image information (compressing of image information) and for carrying out a decoding of image information (expanding of image information). Image processing module 27 also includes a scanner interface 71 for scanning device 31, a printer interface 73 for printing device 39 and an internal bus 75, which interconnects a first group including magnification/reduction circuit 65 and length and breadth conversion circuit 67 and a second group including signal compressing/expanding circuit 69, scanner interface 71 and printer interface 73. Signal compressing/expanding circuit 69 performs the Modified Huffman (MH) transform or the Modified Read (MR) transform to execute the band compressing or the band expanding.

Communication control module 29 includes a communication interface 77, e.g., bus communication processor (BCP), which is connected to a local area network, for example. Communication interface 77 may include a facsimile communication processor (FCP) and a universal communication processor (UCP) which is connected to an external device, e.g., personal computer, through an appropriate interface.

Scanning device 31 may be a two-dimentional scanning unit. Image information such as a document is photoelectrically converted by two-dimensional scanning into electric signals corresponding to the image information.

Optical disk device 33 sequentially stores the image information outputted from scanning device 31 into optical disk 33a. Image information stored in optical disk 33a is retrieved in accordance with specified retrieval key data, e.g., a title, a retrieval key word, etc., inputted by keyboard 35, and a desired image information corresponding to the specified retrieval key data is read out of optical disk 33a.

Specific retrieval key data corresponding to the image information to be retrieved from optical disk 33a is inputted by keyboard 35. Various control commands, e.g., storing, retrieving, editing, etc., are also inputted by keyboard 35.

In general, a cursor (not shown) is displayed on the display screen 37s of CRT display device 37. The cursor is moved on the display screen 37s in a desired direction by the operation of mouse 43. Thus, a title, a desired area used in an image editing, or various operation modes indicated by the corresponding pictures or symbols (icon) on the display screen 37s which may be pointed out by the cursor can be selected or fixed by the operation of mouse 43.

CRT display device 37 displays image information which was read by scanning device 31 or was retrieved from optical disk 33a. The above-described conventional icons (not shown) are displayed at the upper or lower side or right hand side of the display screen 37s of CRT display device 37, for example.

Printing device 39 prints, as a visible image, image information which is read by scanning device 31 or retrieved from optical disk 33a.

Magnetic disk device 41 stores various control programs in magnetic disk 41a set therein. Magnetic disk device 41 also stores search data (search information) including retrieval key data, a retrieval-frequency, a size of image information and a memory address on optical disk 33a at which image information corresponding to the retrieval key data is stored.

Figure 2:
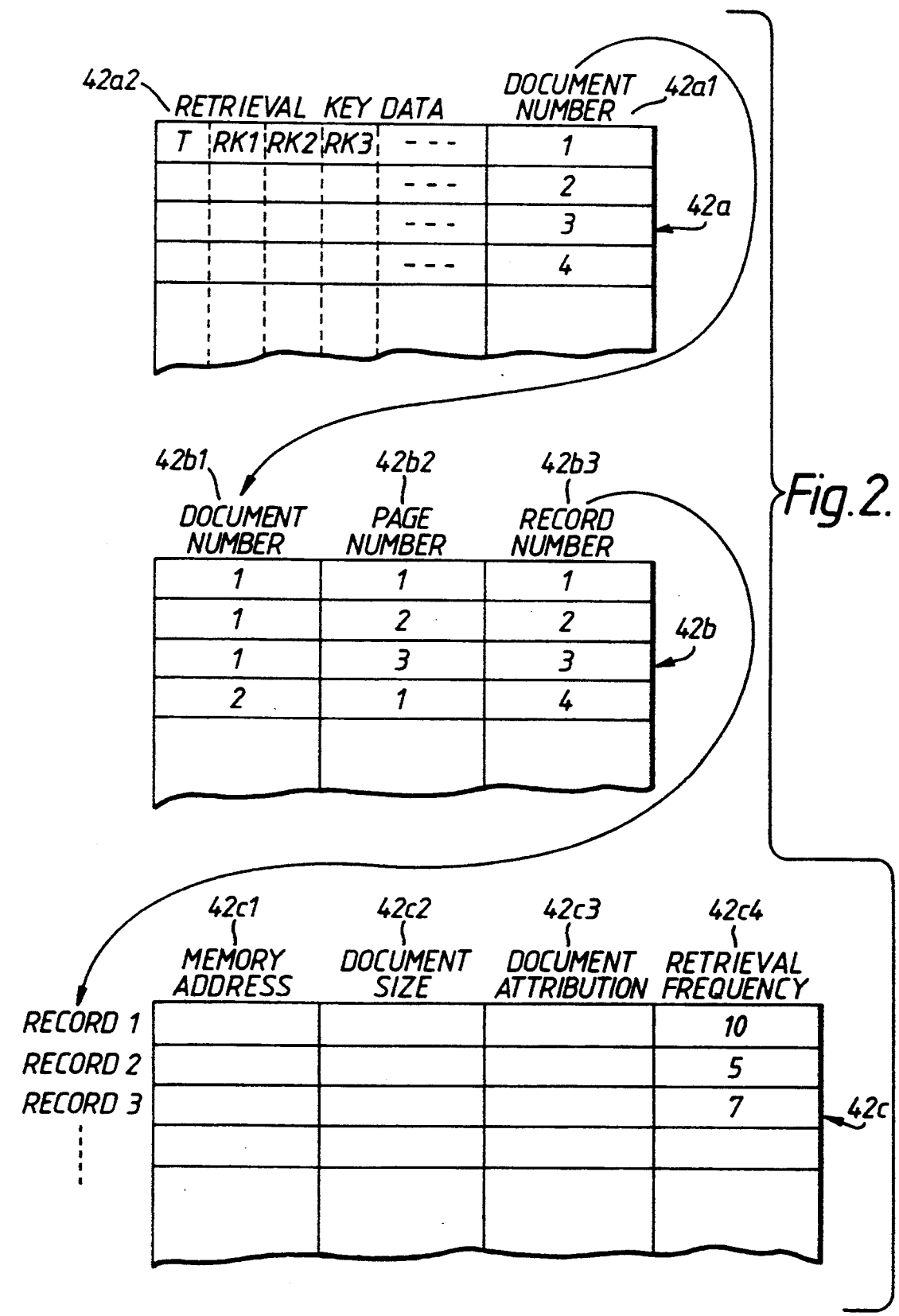
FIG. 2 illustrates how search data for administrating image information are stored in an area of the magnetic disk.
Figure 3A:
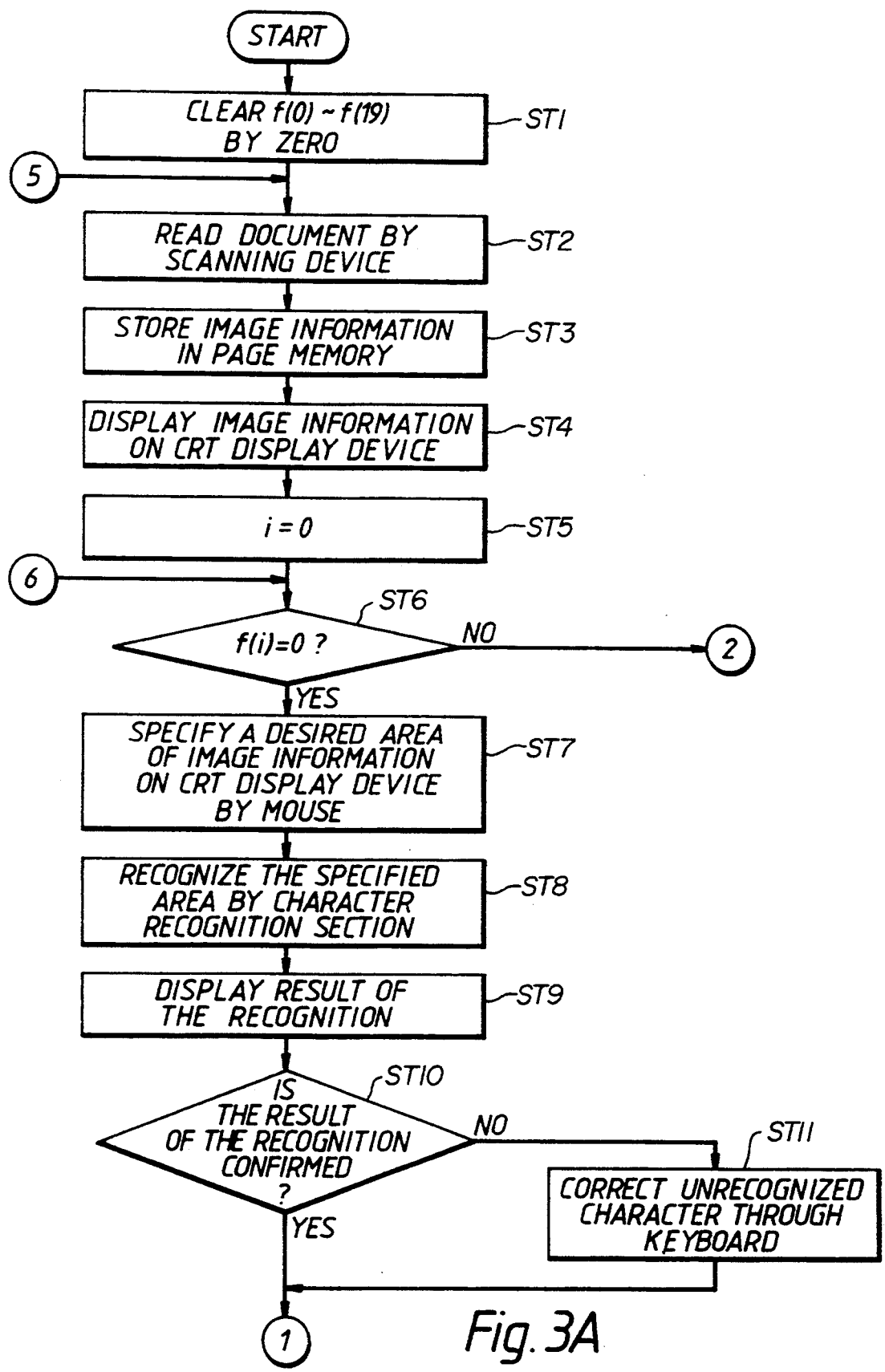
FIG. 3A-3D are flow charts of the registration of retrieval key data of the document filing apparatus according to the present invention.
Figure 3B:
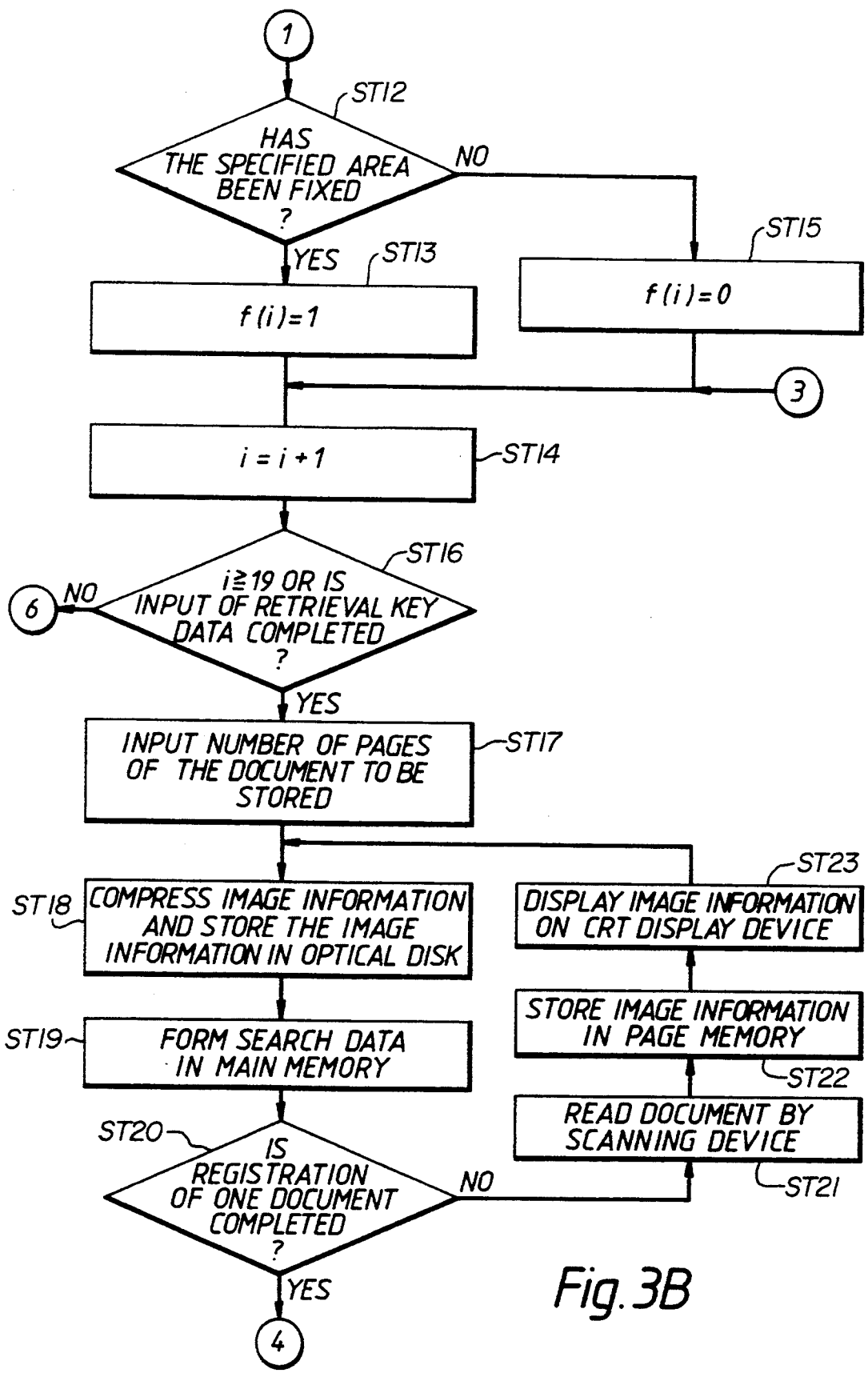
Figure 3C:
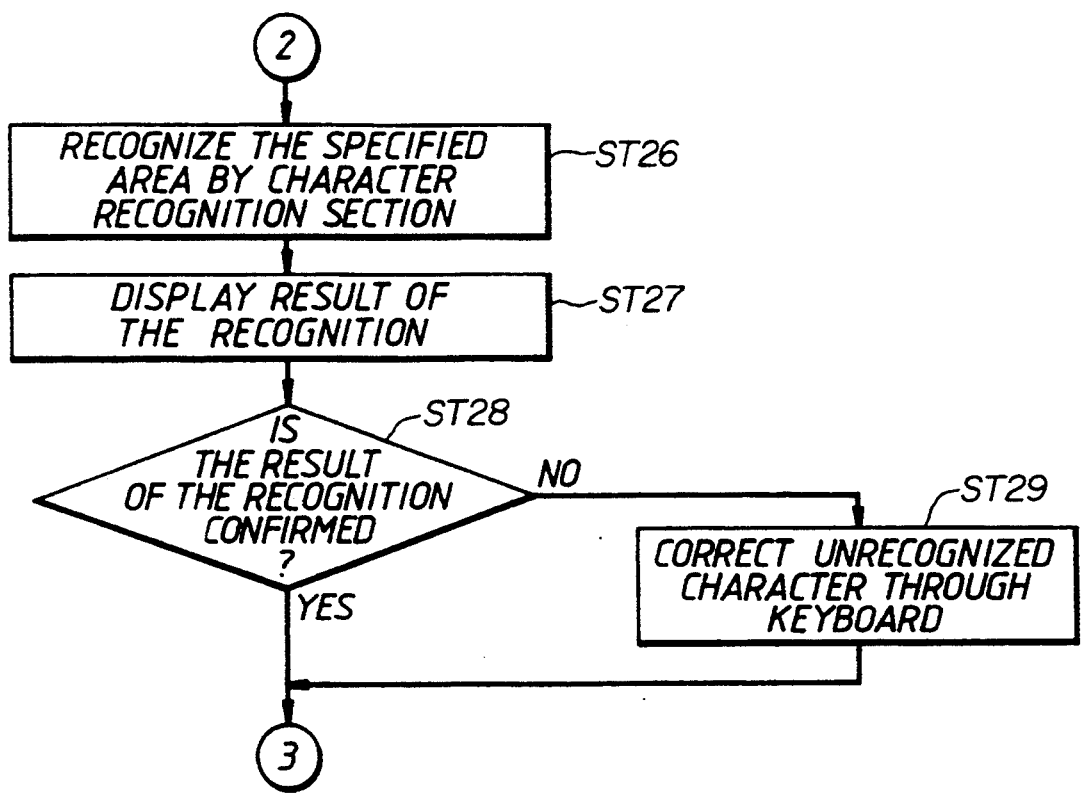
Figure 3D:
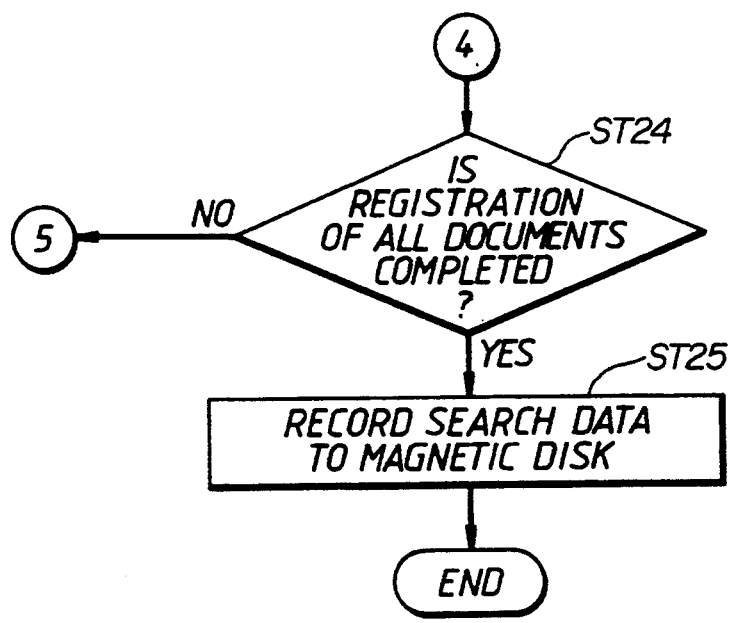

The above-described search data is managed by a document management table 42 stored in magnetic disk 41a. As shown in FIG. 2, document management table 42 includes a title management table 42a, a page management table 42b and a record management table 42c. Each table 42a, 42b, 42c is imagenary illustrated in FIG. 2.

In title management table 42a, sequential document numbers are stored in subsequent rows of a document column 42a1 respectively and retrieval key data including a title T, a plurality of retrieval key words RK1, RK2, RK3, . . . , is stored in each row of a retrieval key data column 42a2 in correspondence with each document number. Page management table 42b has a document number column 42b1, a page number column 42b2 and a record number column 42b3. Sequential record numbers are respectively stored in the rows of record number column 42b3 so that one record number corresponds to one page of the document. Record management table 42c has a memory address column 42c1 (a memory start location) of the image information (document) on optical disk 33a, a document size column 42c2 (image information size), a column of an attribution of the image information 42c3, e.g., a compressing system, resolution, etc., and a retrieval-frequency column 42c4 (frequency of access). Rows of each column correspond to the sequential record numbers. The above-described memory address is a logical address, and therefore a physical track address and a physical sector-address are calculated from the memory address when retrieving.

A storing operation of image information (document) of the above-described image filing apparatus will be described with reference to FIG. 3.

Firstly, a registration mode is selected by keyboard 35. In step ST1, flags f(0)–f(19) are cleared by zero, respectively. In this case, ninteen retrieval key words RK1, RK2, . . . RK19 and one title T can be inputted against one document to be stored. In step ST2, a document is read by scanning device 31. The document is set on scanning device 31, and CPU 51 starts optical disk device 33 and scanning device 31. Scanning device 31 scans the image information of the document to convert the image information into electric signals corresponding to the image information. The electric signals of the image information are transmitted to, and stored in page memory 59, line by line in step ST3. The electric signals of the image information stored in page memory 59 are then stored in display memory 61, and the stored image information is displayed on CRT display device 37 by display control section 63 in step ST4. In step ST5, a flag pointer i is cleared by zero. Flag f(i) is compared with zero in step ST6, and the YES-path is taken if flag f(i) is zero. Otherwise, the NO-path is taken. In step ST7, retrieval key data (title, key word, etc.) are inputted by mouse 43.

Figure 4:
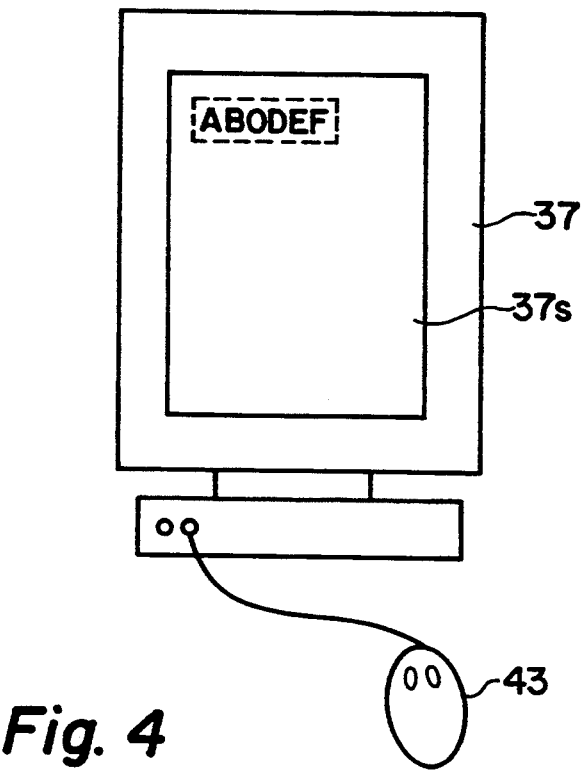
FIG. 4 is a front view of a CRT display device with a mouse.
Figure 5:
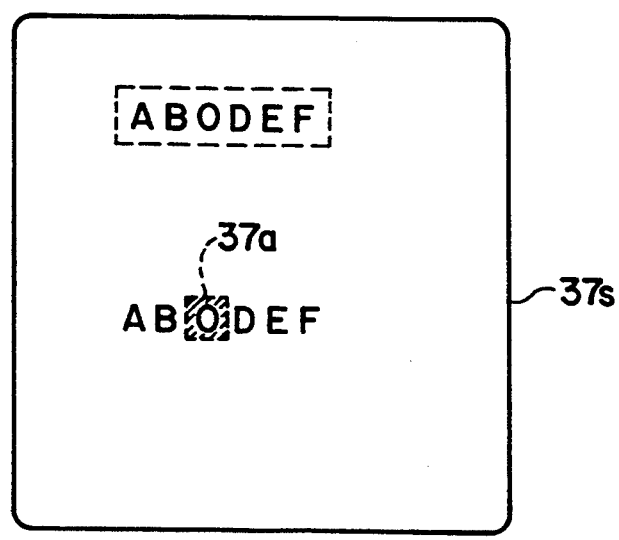
FIG. 5 illustrates how the retrieval key data is determined.

The inputting operation of retrieval key data using mouse 43 will now be described. As shown in FIG. 4, a desired area of the display screen 37s of CRT display device 37 on which the image information (document) has been displayed is physically defined, e.g., as a title T, by mouse 43 in step ST7. In this case, an area surrounded with a dotted line is specified. In step ST8, the content of the specified area (a portion of the image information corresponding to the specified area of the display screen 37s), i.e., ABODEF, is recognized by character recognition section 57. A result of the recognition is displayed on CRT display device 37 in step ST9. As shown in FIG. 5, the specified area and the result of the recognition are displayed on CRT display device 37. Thus, alphabetic characters "ABODEF" are recognized. In step ST10, if the result of the recognition displayed on CRT display device 37 is confirmed by the operator, the YES-path is taken. Otherwise, the NO-path is taken. In this case, as shown in FIG. 5, if an alphabet "O" of the alphabetic characters "ABODEF" is not recognized distinguishing from a numeral "0 (zero)", a cursor 37a located on the alphabet "0" flashes to indicate that the character indicated by cursor 37a can not be recognised. Thus, an operator inputs alphabet "O" through keyboard 35 at a location of the unrecognized character indicated by cursor 37a in step ST11. In step ST12, when the specified area is fixed, the YES-path is taken. Otherwise, the NO-path is taken. When a fixing of the specified area is selected, an address of display memory 61 which corresponds to the specified area of the display screen 37s of CRT display device 37 pointed out by mouse 43 is memorized. In step ST13, flag f(i) is set to one (1). Thus, the above-described address is stored in RAM (not shown) of main memory 55 in correspondance to flag f(i). Then, flag pointer i is increased by one in step ST14. If the fixing of the specified area is not selected in step ST12, flag f(i) is set to zero (0) in step ST15 and the above-described step ST14 is executed. Thus, the above-described address is not stored in the RAM of main mamory 55. In step ST16, if flag pointer i is twenty (20) or the input operation of the retrieval key data is completed, the YES-path is taken. If the NO-path is taken in step ST16, the above-described step ST6 is reexecuted.

If the YES-path is taken in step ST16, a number of pages of the document to be stored is inputted by keyboard 35 in step ST17. In step ST18, when the operator depresses a registration key (not shown), CPU 51 supplies a control signal to page memory 59. In response to this control signal, page memory 59 transfers the A4-sized one-page image information to signal compressing/expanding circuit (CODEC) 69, line by line. Signal compressing/expanding circuit 69 performs the modified Huffman (MH) transform to execute the band-encoding of each line of the one-page image information and supplies the one-page image information to optical disk device 33. When the one-page image information is stored in optical disk 33a, CPU 51 forms the search data including retrieval key data and the memory address on optical disk 33a at which the one-page image information is stored and stores the search data in main memory 55 in step ST19. In step ST20, if the registration of one document is completed, the YES-path is taken. Otherwise, the NO-path is taken. In this step ST20, it is examined that whether repetition of the one-page image information storing operation has been carried out at prescribed number of times which correspond to the number of pages of the document inputted in step ST17.

When the NO-path is taken in step ST20, steps ST21, ST22 and ST23 are executed, respectively. Contents of steps ST21, ST22 and ST23 are similar to those of steps ST2, ST3 and ST4, and therefore descriptions thereof are not repeated. The above-described step ST18 is reexecuted after step ST23 is carried out.

When the YES-path is taken in step ST20, completion of the registration of all documents is judged in step ST24. If the registration of all documents is completed, the YES-path is taken in step ST24. In step ST25, CPU 51 transfers the search data stored in main memory 55 to magnetic disk device 41 and records the search data to magnetic disk 41a. If the NO-path is taken in step ST24, the above-described steps ST2, ST3, ST4, ST5 and ST6 are reexecuted. At this time, in step ST6, the NO-path is taken if flag f(i) is one (1). The numerical number one (1) in flag f(i) means that the specified area fixed in step ST12 which was executed at the last time exists. In step ST26, the content of the fixed area which has been specified is recognized by character recognition section 57. After that, steps ST27, and ST28 are executed, respectively. Step ST29 is executed if the NO-path is taken in step ST28. Contents of the above-described steps ST27, ST28 and ST29 are similar to those of steps ST9, ST10 and ST11, and therefore descriptions thoseof are not repeated. After step ST28 or ST29 is executed, step ST14 is executed. The above-described steps which exclude the steps relating to the specifying operation of an area of the display screen 37s of CRT display device 37 are described in more detail in the U.S. Pat. No. 4,604,653 assigned to the same assignee.

The retrieving operation of the above-described image filing apparatus is also described in more detail in the U.S. Pat. No. 4,604,653, and therefore the descriptions thereof are omitted.

With the above-described embodiment, an area of the display screen of the CRT display device on which the image information (document) has been displayed is specified by the mouse, and the content of the specified area which would be a title or a key word is recognized by the character recognition section. Thus, the registration of retrieval key data including a title or a key word is significantly simplified when the image information (document) is stored in the image filing apparatus. Furthermore, since the area of the display screen of the CRT display device which is specified by the mouse can be fixed, the fixed specified area is applicable to documents having a common form. Thus, the same location (area) of documents can always be specified without using a mouse if an area of the display screen of the CRT display device which corresponds to the common area of the documents to be stored once has been fixed.

According to the present invention, since retrieval key data including a title end a key word is specified or selected from the image information displayed by the dispay device, the operation of input keys of the keyboard is unnecessary when registering the retrieval key data. Thus the registration of the title and the key word is significantly simplified.

The present invention has been described with respect to a specific embodiment. However, other embodiments based on the principles of the present invention will be obvious to those of ordinary skill in the art. Such embodiments are intended to be covered by the claims.

What is claimed is:

1. A document filing apparatus for filing a document as image information corresponding to the document with retrieval key data, comprising:
   means for scanning image information of a document to convert the image information into electronic signals which correspond to the image information;
   means for displaying the image information obtained by the scanning means;
   means for physically defining on the displaying means a portion of the image information displayed on said displaying means, as image-based retrieval key data;
   character recognition means for recognizing characters in the image-based retrieval key data so as to create character-based retrieval key data;
   means for registering the character-based retrieval key data with the image information;
   optical disk means for storing the image information that the registering means correlates with the character-based retrieval key data.

2. An apparatus according to claim 1, wherein the defining means include a pointing device.

3. An apparatus according to claim 1, wherein the registering means includes a magnetic disk device.

4. A document filing apparatus for filing a document as image information corresponding to the document with retrieval key data, comprising:
   means for scanning image information of a document to convert the image information into electronic signals which correspond to the image information;
   means for displaying the image information obtained by the scanning means, the displaying means having a display screen on which the image information is displayed;
   means for physically defining an area of the display screen of the displaying means on which the image information has been displayed;
   character recognition means for recognizing characters in the portion of the image information corresponding to the physically defined area of the display screen of the displaying means;
   means for registering the recognized characters as retrieval key data; and
   optical disk means for storing the image information that the registering means correlates with the retrieval key data.

5. A method for inputting retrieval key data corresponding to a document to be stored in an image filing apparatus, including the steps of:
   scanning image information of a document to convert the image information into electronic signals which correspond to the image information;
   displaying the image information obtained by the scanning step on a display screen of a display device;
   physically defining an area of the display screen of the display device on which the image information has been displayed as image-based retrieval key data;
   recognizing characters in the image-based retrieval key data so as to create character-based retrieval key data;
   registering the character-based retrieval key data with the image information; and
   storing the image information that the registering means correlates with the character-based retrieval key data.

6. A method according to claim 5, wherein the image-based retrieval key data includes at least two images, and the recognizing step further includes a step of indicating unrecognized image-based retrieval key data if at least one of the at least two images is not recognized as a character.

7. A method according to claim 6 further including a step of inputting a character at a location of the unrecognized image based retrieval key data indicated on the display screen.

8. A method according to claim 5 further including a step of fixing so as to maintain the same physically defined area of the display screen of the display device on which image information has been displayed.

9. A document filing apparatus for filing a document as image information corresponding to the document with retrieval key data, comprising:
   means for scanning image information of a document to convert the image information into electronic signals which correspond to the image information;
   means for displaying the image information obtained by the scanning means;
   means for physically defining on the displaying means a portion of the image information displayed on said displaying means, as image-based retrieval key data;
   character recognition means for recognizing characters in the image-based retrieval key data so as to create character-based retrieval key data;
   means for displaying the character-based retrieval key data on a display device;
   means for allowing correction of the character-based retrieval key data on the display device when the character-based retrieval key data requires correction;
   means for confirming character-based retrieval key data displayed;
   means for registering the confirmed character-based retrieval key data with the image information; and
   optical disk means for storing the image information that the registering means correlates with the character-based retrieval key data.

10. A document filing apparatus for filing a document as image information corresponding to the document with retrieval key data, comprising:
    means for scanning image information of a document to convert the image information into electronic signals which correspond to the image information;
    means for displaying the image information obtained by the scanning means, the displaying means having a display screen on which the image information is displayed;
    means for physically defining an area of the display screen of the displaying means on which the image information has been displayed;

character recognition means for recognizing characters in the portion of the image information corresponding to the physically defined area of the display screen of the displaying means;

means for registering the recognized characters as retrieval key data;

means for displaying the recognized retrieval key data on the display means;

means for allowing correction of the recognized retrieval key data displayed on the display device when the recognized retrieval key data requires correction; and optical disk means for storing the image information that the registering means correlates with the retrieval key data.

11. A method for inputting retrieval key data corresponding to a document to be stored in an image filing apparatus, including the steps of:

scanning image information of a document to convert the image information into electronic signals which correspond to the image information;

displaying the image information obtained by the scanning step on a display screen of a display device;

physically defining an area of the display screen of the display device on which the image information has been displayed as image-based retrieval key data;

recognizing characters in the image-based retrieval key data so as to create character-based retrieval key data;

displaying the character-based retrieval key data on the display screen;

allowing correction of the character-based retrieval key data on the display device when the character-based retrieval key data requires correction;

confirming the character-based retrieval key data displayed when no correction is required;

registering the confirmed character-based retrieval key data with the image information; and storing the image information that the registering means correlates with the character-based retrieval key data.

* * * * *